F. L. DYER.
PORTABLE ELECTRIC HEATER.
APPLICATION FILED OCT. 7, 1910.
1,021,974.
Patented Apr. 2, 1912.
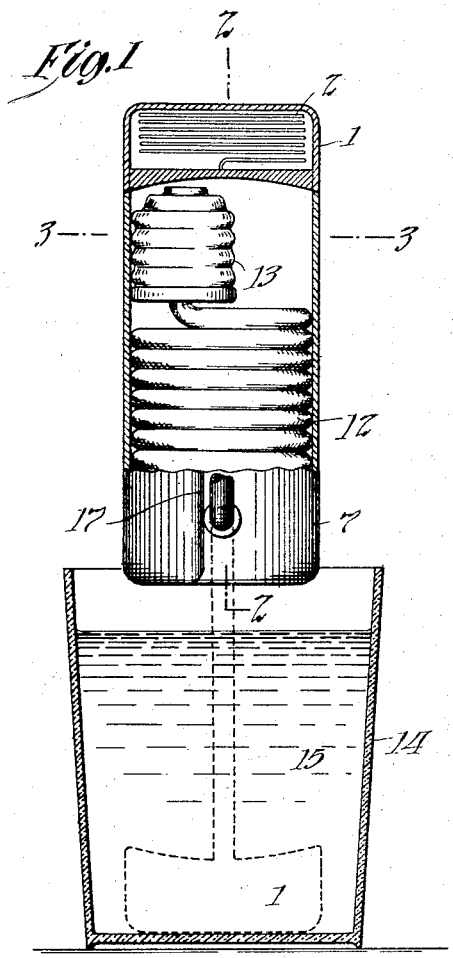
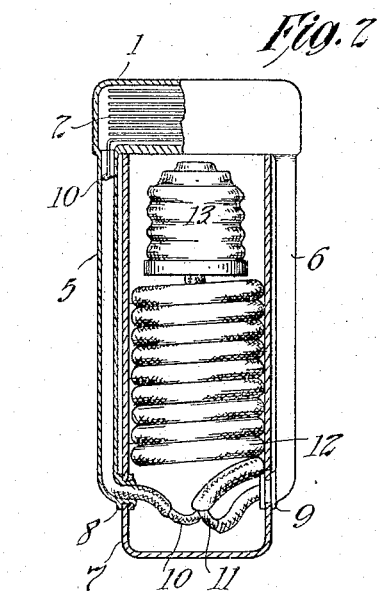
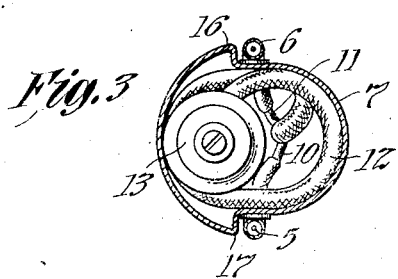
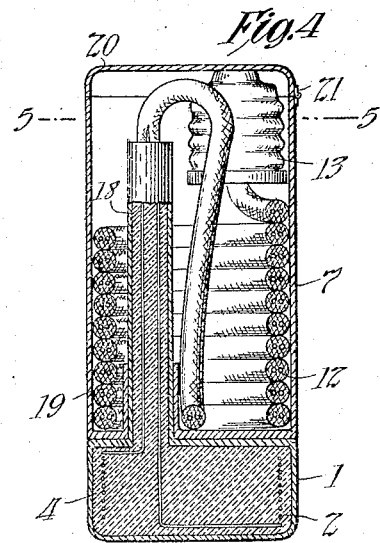
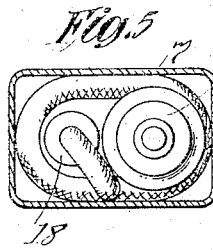
Witnesses:
Frank D Lewis
Dyer Smith
Inventor:
Frank L. Dyer

UNITED STATES PATENT OFFICE.

FRANK L. DYER, OF MONTCLAIR, NEW JERSEY.

PORTABLE ELECTRIC HEATER.

1,021,974.　　　　　Specification of Letters Patent.　　Patented Apr. 2, 1912.

Application filed October 7, 1910.　Serial No. 585,738.

*To all whom it may concern:*

Be it known that I, FRANK L. DYER, a citizen of the United States, and a resident of Montclair, in the county of Essex and State of New Jersey, have invented a certain new and useful Portable Electric Heater, of which the following is a description.

My invention relates to electric heaters, and is an improvement upon the device for which U. S. Letters Patent No. 969,849, portable electric heater, was granted to me September 13, 1910. The patented invention comprised a compact device suitable to be easily put in one's pocket and connected to any suitable source of electric current when it was desired to heat water or any desired substance. The device referred to consisted of a chamber or casing for inclosing in compact form the plug and electrical connections when not in use, the heater being integral with the casing. When such a device is used, for example, for heating water in a small vessel, a disadvantage has been noted in that a considerable amount of the water is displaced. My present invention overcomes this difficulty by making the heater of sufficiently small size to displace but little water when placed in a glass or other receptacle, the heater being adapted when not in use to be retained in compact form in axial alinement or in contact with the casing in which the electrical connections from the heater are adapted to be coiled when not in use. The heater may be either entirely separable from the casing or joined thereto in such a way that it may be moved therefrom to a position in which the heater may be lowered into a fluid to be heated, while the casing remains above the surface of the same.

The object of my invention is to provide an efficient device of the character referred to, and other objects of my invention reside in the construction of parts and combinations of elements as will appear more fully in the following specification and appended claims.

In order that a clearer understanding of my invention may be had, attention is hereby directed to the accompanying drawings forming part of this specification, in which—

Figure 1 represents a side elevation of one form of my device, certain parts being shown in section; Fig. 2 represents a section on line 2—2 of Fig. 1, certain parts being shown in side elevation; Fig. 3 represents a horizontal section on line 3—3 of Fig. 1, the plug and coil connections being shown in plan; Fig. 4 represents a central vertical section of a modified form of my device, certain parts being shown in side elevation; and Fig. 5 is a horizontal section taken on line 5—5 of Fig. 4, the plug and coil connections being shown in plan.

Referring more particularly to Figs. 1 and 2, the heater 1 is formed of any suitable material, preferably metal, which should be a good conductor of heat. The heater is hollow and contains the heating coil 2, the space between the convolutions of the coil and the heater surface being filled with any suitable insulating material, as shown at 4 in Fig. 4. The two ends of the heating coil 2 extend into tubular arms or conduits 5 and 6 which are pivotally connected to the casing or chamber 7 as shown in Fig. 2 at 8 and 9. The insulated conductors 10 and 11 extending from tubular arms 5 and 6 into the interior of casing 7 are inclosed together within cord 12 which, together with plug 13 secured to the other end of the cord, is adapted to be compactly arranged within casing 7 when the heater is not in use. The arms or conduits 5 and 6 are pivotally connected to the casing 7 in any suitable manner, as, for instance, in the manner indicated in the drawings. The arms 5 and 6 are preferably of such length that when the device is not in use the heater may be swung into the position shown in full lines in Fig. 1, in which the heater forms a top or cover for the open upper end of casing 7, in which position the heater and casing are in axial alinement with each other, and the device may easily be carried in the pocket or among the belongings of the user. When it is desired to use the device, the heater is simply swung about its pivots 8 and 9 through an angle of approximately 180 degrees into the position shown in dotted lines in Fig. 1, the plug 13 and coil 12 being pulled out through the open end of casing 7 and the plug inserted into a lamp socket or otherwise connected with a suitable source of current. In this position the casing 7 may be used as a handle and the heater 1 inserted in the receptacle 14 containing water or other fluid 15 for heating the same, the casing 7 remaining above the level of the fluid. The casing 7 is preferably formed, as shown in Fig. 3, with the shoulders 16 and 17 against which the arms 5 and 6 may abut when the heater 1 is swung into the position shown in full lines in Fig. 1, in which it is in axial alinement with the casing 7 and forms a top for the same. It is obvious that any other form of stop might be used for positioning the heater in alinement with the casing when in non-operative position, and also that the protecting conduits 5 and 6 might be omitted from the construction, in which case the conductors 10 and 11 extending from the two ends of heating coil 2 would enter the casing 7 in the same manner as that shown, but would be unprotected by rigid tubing.

In the form of my device illustrated in Figs. 4 and 5, the heater 1 is slidable therefrom when it is desired to use the same. In this case heater 1 may be formed with an elongated hollow tube 18 integral therewith through which the ends of heating coil 2 extend to connect with the flexible connection 12, the interior of tube 18 being filled with insulating material after the conductors have extended therethrough. The lower end of casing 7 may be provided with an opening through which tube 18 may be inserted when it is desired to place the device in compact form when not in use. A short sleeve 19 may extend upwardly from this opening to frictionally engage the tube 18 when the device is out of use to hold the heater by friction in alinement with casing 7 and in contact therewith. The casing may be provided with a cover 20 hinged as shown at 21 to casing 7, if desired. When it is desired to use this form of my device, the heater is pulled away from the casing, tube 18 sliding through sleeve 19, cover 20 is opened and plug 13 and flexible conductor 12 extended therefrom. When one is through using the device, the plug is disconnected from the source of current, the heater again shoved into the position shown in Fig. 4 in compact alinement with casing 7, conductor 12 is again coiled within the casing, and the plug positioned therein and the cover closed.

It is obvious that if desired some positive fastening means between heater 1 and casing 7 might be provided for securing the same in the relation shown in Fig. 4, in which case sleeve 19 would be unnecessary. It is also obvious that other departures from the specific construction illustrated might be made without departing from the spirit of my invention.

Having now described my invention, what I claim and desire to protect by Letters Patent is as follows:—

1. In a portable heater, the combination of a heater, a heating coil within the same, a plug and connections between and joined to the same and said coil, and a casing for inclosing said plug and connections when not in use, said heater being pivotally connected to said casing, substantially as described.

2. In a portable heater, the combination of a heater, a heating coil within the same, a plug and connections between and joined to the same and said coil, and a casing for inclosing said plug and connections when not in use, said heater being adapted to be retained in axial alinement with said casing when not in use and moved therefrom for use, substantially as described.

3. In a portable heater, the combination of a heater, a heating coil within the same, flexible electrical connections joined to said coil, a tubular casing for compactly inclosing said connections when not in use, said heater and casing being constructed to permit the compact adjustment and retention of the heater in axial alinement with said casing when not in use, said heater being movable out of said position when it is to be used, substantially as described.

4. In a portable heater, the combination of a casing, a heater, a heating coil within the same, flexible electrical connections joined to said coil adapted to be inclosed within said casing when not in use, and means connecting said heater to said casing permitting movement of said heater away from said casing when said heater is to be used, substantially as described.

5. In a portable heater, the combination of a casing, a heater, a heating coil within the same, flexible electrical connections joined to said coil adapted to be inclosed within said casing when not in use, and means connecting said heater to said casing permitting movement of said heater into position to form a cover for said casing when said heater is out of use, substantially as described.

6. In a portable heater, the combination of a casing, a heater, a heating coil within the same, flexible electrical connections joined to said coil adapted to be inclosed within said casing when not in use, elongated hollow means of small cross-sectional area joining said heater to said casing and conducting means extending therethrough joining said heating coil to said connections, said hollow means being pivoted to said casing, substantially as described.

7. In a portable heater, the combination of a casing, a heater, a heating coil within the same, flexible electrical connections joined to said coil adapted to be inclosed within said casing when not in use, a pair of tubular arms connected to said heater and pivoted to said casing, and conducting means extending therethrough joining said heating coil to said connections, substantially as described.

8. In a portable heater, the combination of a heater, a heating coil therein, flexible electrical connections extending therefrom, and means for retaining said heater and connections in compact form when not in use, and including a casing for inclosing the connections, said heater being movably connected to the said casing and adapted to be moved relatively thereto for use, substantially as described.

9. In a portable heater, the combination of a heater, a heating coil within the same, a plug and connections between and joined to the same and said coil, and a casing for inclosing said plug and connections when not in use, said heater being movably connected to said casing, substantially as described.

This specification signed and witnessed this 30th day of September 1910.

FRANK L. DYER.

Witnesses:
DYER SMITH,
ANNA R. KLEHM.

Copies of this patent may be obtained for five cents each, by addressing the "Commissioner of Patents, Washington, D. C."